United States Patent
Tashiro et al.

(10) Patent No.: US 9,203,274 B2
(45) Date of Patent: Dec. 1, 2015

(54) ELECTROMAGNET FOR STATOR AND MANUFACTURING METHOD OF ELECTROMAGNET FOR STATOR

(75) Inventors: Keiichi Tashiro, Yokosuka (JP); Futoshi Kojima, Yamato (JP); Hisanobu Higashi, Yokohama (JP); Masaru Yuhara, Ibaraki (JP); Kunitomo Ishiguro, Odawara (JP); Takashi Kotsuji, Fuji (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 411 days.

(21) Appl. No.: 13/635,995

(22) PCT Filed: Mar. 3, 2011

(86) PCT No.: PCT/JP2011/054909
§ 371 (c)(1),
(2), (4) Date: Sep. 19, 2012

(87) PCT Pub. No.: WO2011/118357
PCT Pub. Date: Sep. 29, 2011

(65) Prior Publication Data
US 2013/0009512 A1   Jan. 10, 2013

(30) Foreign Application Priority Data
Mar. 23, 2010  (JP) .................................. 2010-065753

(51) Int. Cl.
*H02K 3/34* (2006.01)
*H01F 41/00* (2006.01)
(Continued)

(52) U.S. Cl.
CPC .............. *H02K 3/522* (2013.01); *H02K 15/045* (2013.01); *H02K 15/0081* (2013.01); *H02K 2203/06* (2013.01); *H02K 2203/12* (2013.01); *Y10T 29/4902* (2015.01)

(58) Field of Classification Search
CPC .......... H02K 2203/12; H02K 15/0081; H02K 15/045; H02K 3/522; H02K 2203/06; Y10T 29/4902
USPC ................... 310/215, 214, 194, 260; 29/602.1
See application file for complete search history.

(56) References Cited

U.S. PATENT DOCUMENTS 7,026,739 B2 *  4/2006  Okada et al. ................... 310/194
7,732,968 B2 *  6/2010  Zimmer et al. ................ 310/194
(Continued)

FOREIGN PATENT DOCUMENTS

JP             63-22707 U      2/1988
JP            2002-284446 A    10/2002
(Continued)

OTHER PUBLICATIONS

Translation of foreign document JP 2008178223 (Year 2008).*
(Continued)

*Primary Examiner* — Alex W Mok
(74) *Attorney, Agent, or Firm* — Foley & Lardner LLP

(57) ABSTRACT

A stator is provided with a tooth, an insulator attached to the tooth, and a coil wound around the insulator. The insulator is provided with a winding barrel around which the coil is wound in a plurality of layers, a flange projecting in a radial direction from one end of the winding barrel, and a notch formed in the flange and through which the line material of the coil is inserted. Projecting lengths of the flange from the winding barrel on the both sides of the notch are set different from each other. When the line material of the coil is guided from the outside of the flange to the winding barrel through the notch for winding the coil on the winding barrel, by supporting and bending the line material at a portion having a longer projecting length of the flange, the line material passes the notch easily.

7 Claims, 17 Drawing Sheets

(51) Int. Cl.
*H02K 3/52* (2006.01)
*H02K 15/04* (2006.01)
*H02K 15/00* (2006.01)

(56) References Cited

U.S. PATENT DOCUMENTS

| | | | |
|---|---|---|---|
| 7,812,496 B2 | 10/2010 | Sugiura et al. | |
| 2004/0051417 A1* | 3/2004 | Yamazaki et al. | 310/216 |
| 2004/0155549 A1* | 8/2004 | Marioni | 310/194 |
| 2005/0082940 A1* | 4/2005 | Knauff et al. | 310/260 |
| 2006/0033395 A1* | 2/2006 | Izumi et al. | 310/208 |
| 2006/0043806 A1* | 3/2006 | Torii et al. | 310/71 |
| 2006/0119207 A1* | 6/2006 | Okada et al. | 310/194 |
| 2007/0279178 A1* | 12/2007 | Zimmer et al. | 336/208 |
| 2009/0189474 A1* | 7/2009 | van Heyden et al. | 310/195 |
| 2010/0181863 A1* | 7/2010 | Murakami et al. | 310/215 |

FOREIGN PATENT DOCUMENTS

| | | | |
|---|---|---|---|
| JP | 2003-204645 A | | 7/2003 |
| JP | 2007-151353 A | | 6/2007 |
| JP | 2008-072801 A | | 3/2008 |
| JP | 2008-178223 A | | 7/2008 |
| JP | 2008206318 A | * | 9/2008 |
| JP | 2008-236854 A | | 10/2008 |
| JP | 2009038916 A | * | 2/2009 |
| JP | 2009-268178 A | | 11/2009 |

OTHER PUBLICATIONS

Japanese Office Action dated Jan. 14, 2014, (2 pgs.).

* cited by examiner

ELECTROMAGNET FOR STATOR AND MANUFACTURING METHOD OF ELECTROMAGNET FOR STATOR

FIELD OF THE INVENTION

The present invention relates to an electromagnet used for a stator of an electric motor or a generator and a manufacturing method thereof.

BACKGROUND OF THE INVENTION

JP2008-236854 A published by Japan Patent Office in 2008 proposes an electromagnet for a stator of an electric motor or a generator.

This electromagnet for a stator is provided with a stator core formed of a back yoke and teeth projecting from the back yoke toward the center of the stator. An insulator is attached to an outer periphery of each tooth. The insulator has a winding barrel around which a coil is wound. Flanges are formed at respective ends of the winding barrel, one on a tooth base end side in the vicinity of the back yoke and another one on a tooth distal end side.

A notch is formed in the flange on the tooth base end side. In coiling around the winding barrel, a line material of a coil is guided to the winding barrel from the outside of the flange on the tooth base end side through the notch.

SUMMARY OF THE INVENTION

When the coil line material is to be guided to the winding barrel from the outside of the flange on the tooth base end side through the notch, the line material is guided from an opening part of the notch to the inside of the notch in a state where the line material is oblique to a flange surface so that the line material does not interfere with the flanges on the both sides of the notch. At this time, if the line material is easily bent, the line material interferes with the flange, which might make it difficult to guide the line material to the notch. This interference between the line material and the flange lowers efficiency of a coiling work on the insulator and lowers positioning accuracy of a coiling start position of the winding on the winding barrel.

It is therefore an object of this invention to guide the winding of a stator coil to the winding barrel through the notch in the flange easily and reliably.

In order to achieve the above object, this invention provides an electromagnet for a stator. The electromagnet comprises a stator core formed of a back yoke and a tooth projecting from the back yoke, an insulator attached to the tooth, and a coil wound around the insulator. The insulator comprises a winding barrel around which a coil is wound in a plurality of layers, a first flange formed at one end of the winding barrel and having a notch through which a coil line material passes, and a second flange formed at another end of the winding barrel. Projecting lengths of the first flange from the winding barrel on the both sides of the notch are set to be different from each other.

The details as well as other features and advantages of this invention are set forth in the remainder of the specification and are shown in the accompanying drawings.

DESCRIPTION OF THE PREFERRED EMBODIMENTS

Figure 23:
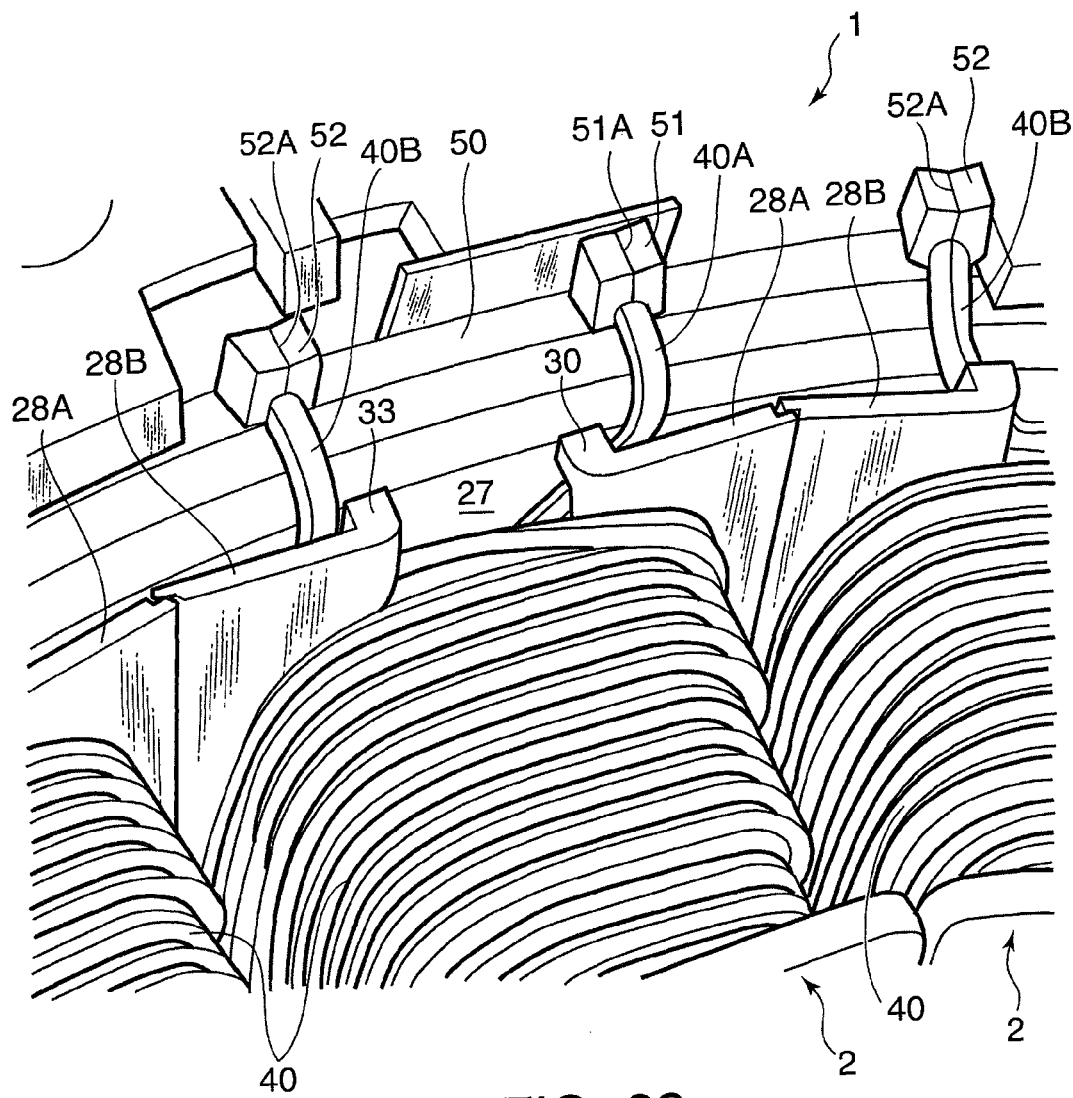
FIG. 23 is a perspective view of essential parts of the stator illustrating a connection state of a start end and a terminal end of the coil on a bus ring for power collection and distribution according to the embodiment of this invention.

Referring to FIG. 23 of the drawings, a stator 1 is a collective name of a plurality of electromagnets 2 arranged around a rotor of an electric motor or a generator in which permanent magnets are arranged.

In the electric motor, the rotor is rotated around a center axis by feeding power to coils so as to magnetize the electromagnets. In the generator, the electromagnets generate an electric current in the coils by means of relative rotation between the rotor and the stator 1 around the center axis.

Figure 2:
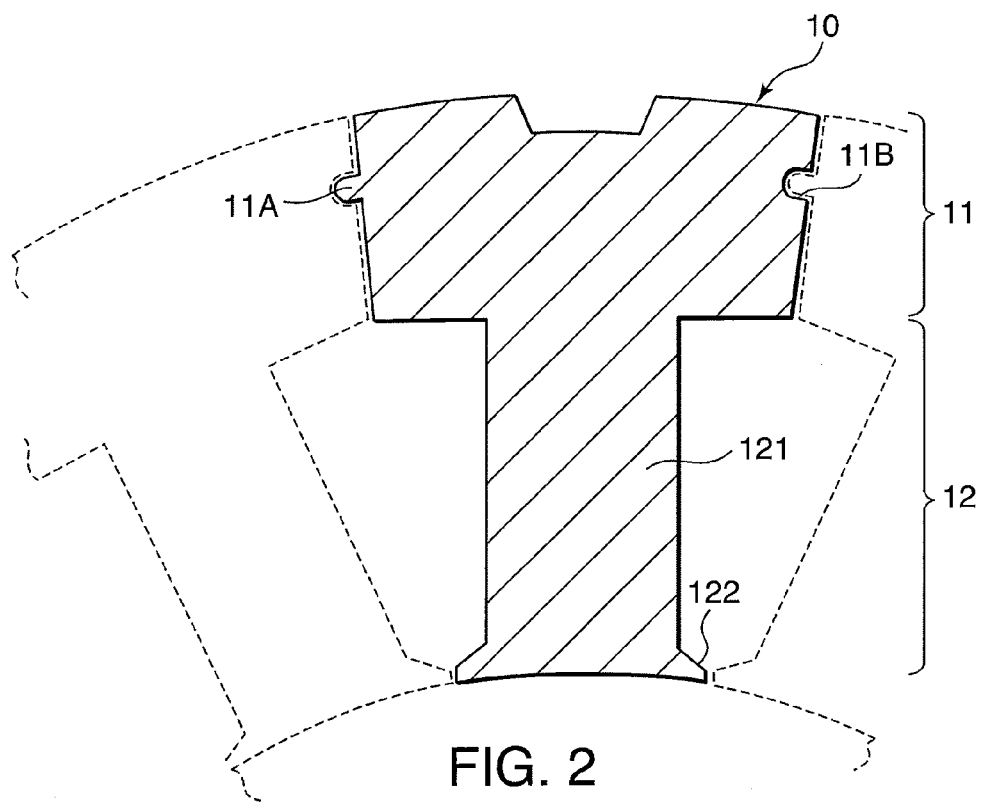
FIG. 2 is a cross-sectional view of a stator core according to the embodiment of this invention.

Referring to FIG. 2, the stator 1 comprises a plurality of stator cores 10 connected in the circumferential direction around the center axis.

The stator core 10 is made of a back yoke 11 and a tooth 12 projecting toward the center axis direction from the back yoke 11. The stator core 10 is constructed by laminating thin electromagnetic steel plates punched substantially in the T-shape. The laminated electromagnetic steel plates are integrated by dwell caulking or welding, for example, so that they do not separate from each other.

A projection 11A is formed on a side face of the back yoke 11. A recess 11B is formed on another side face of the back yoke 11. The projection 11A fits in the recess 11B of an adjacent stator core 10.

The tooth 12 comprises a main body 121 and a distal end part 122. The distal end part 122 is formed at a distal end of the main body 121 and has an enlarged width to form a tapered shape. Distal end faces of the teeth 12 form a circular shape around the center axis. These distal end faces represent magnetic poles of the electromagnets opposing the rotor.

Figure 16:
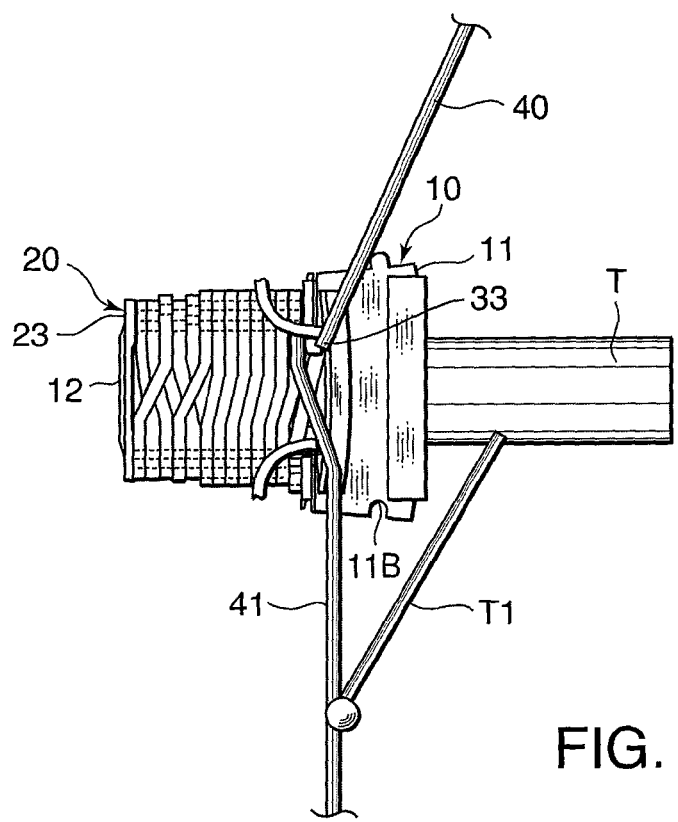
FIG. 16 is an overhead view of the stator core, the jig, and the line material for explaining a seventh stage of the winding process of the coil on the insulator according to the embodiment of this invention.

Referring to FIG. 16, an insulator 20 is provided with a cylindrical winding barrel 21 attached to the outer periphery of the tooth 12 of the stator core 10. A first flange 22 in contact with the back yoke 11 is formed at one end on the back yoke 11 side of the winding barrel 21. A second flange 23 is formed so as to surround the distal end part 122 of the tooth 12 on the other end of the winding barrel 21. The insulator 20 is formed of an insulator such as a resin.

Figure 8:
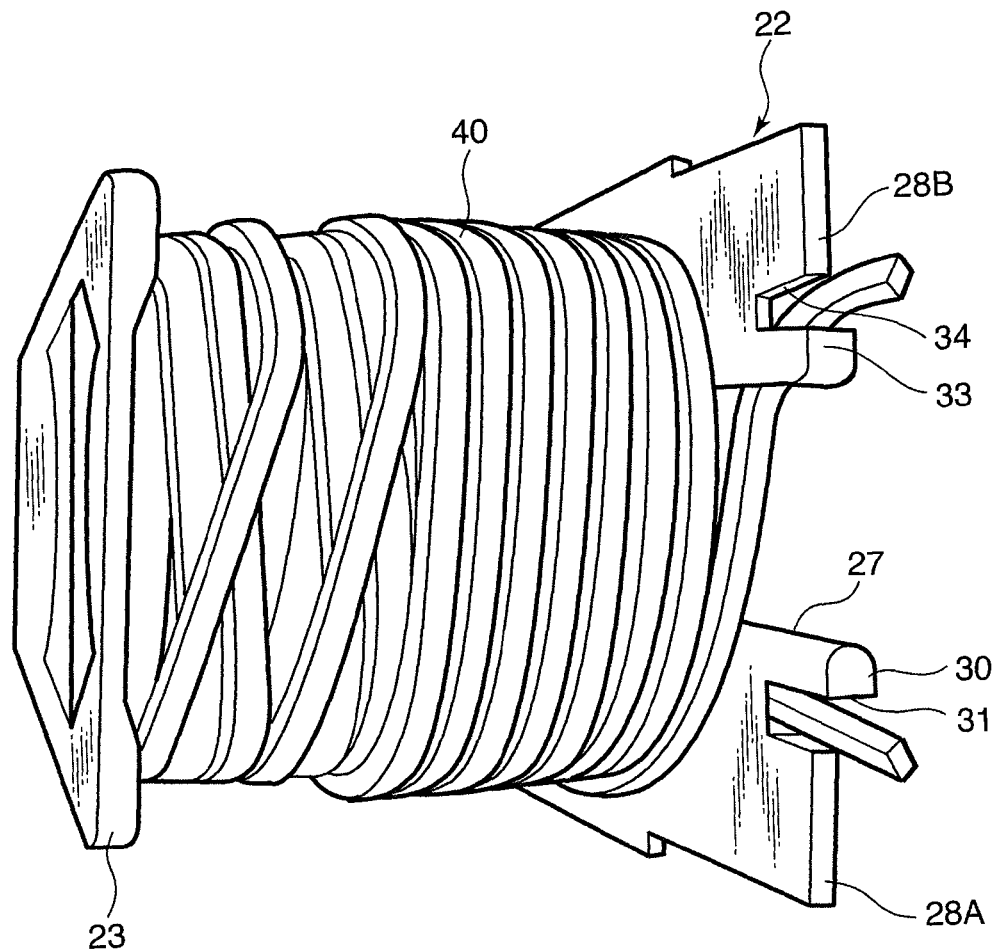
FIG. 8 is a perspective view of a coil wound around the insulator according to the embodiment of this invention.

A line material 40 of a coil is wound around the outer periphery of the winding barrel 21 with normal winding, for example, as shown in FIG. 8. The flanges 22 and 23 on the both ends of the winding barrel 21 regulate the winding width of each winding layer of the line material 40 of the coil. In other words, the flanges 22 and 23 prevent protrusion of the coil to the outside of the insulator 20.

Figure 3:
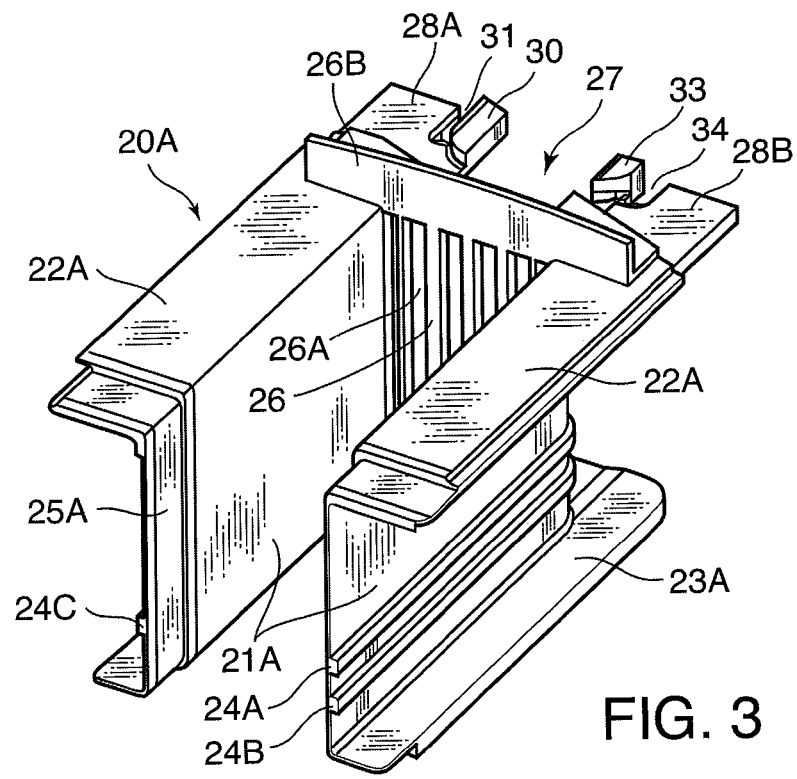
FIG. 3 is a perspective view of a first component forming an insulator according to the embodiment of this invention.
Figure 4:
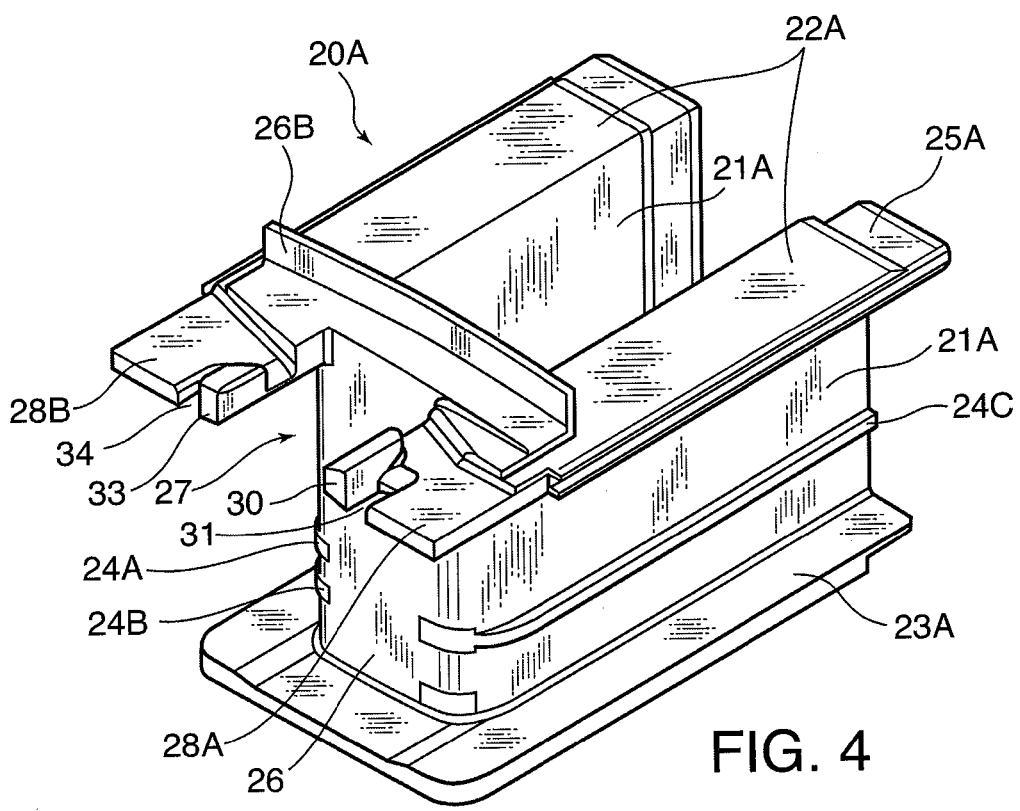
FIG. 4 is a perspective view of the first component when seen from a different direction.
Figure 6:
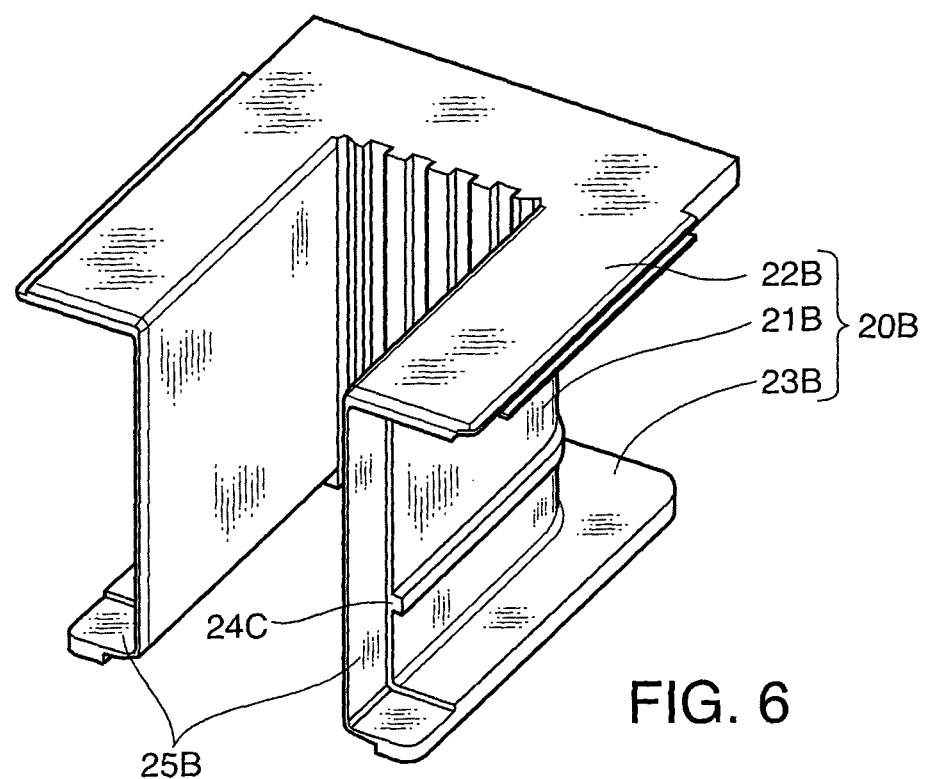
FIG. 6 is a perspective view of a second component forming the insulator together with the first component, according to the embodiment of this invention.
Figure 7:
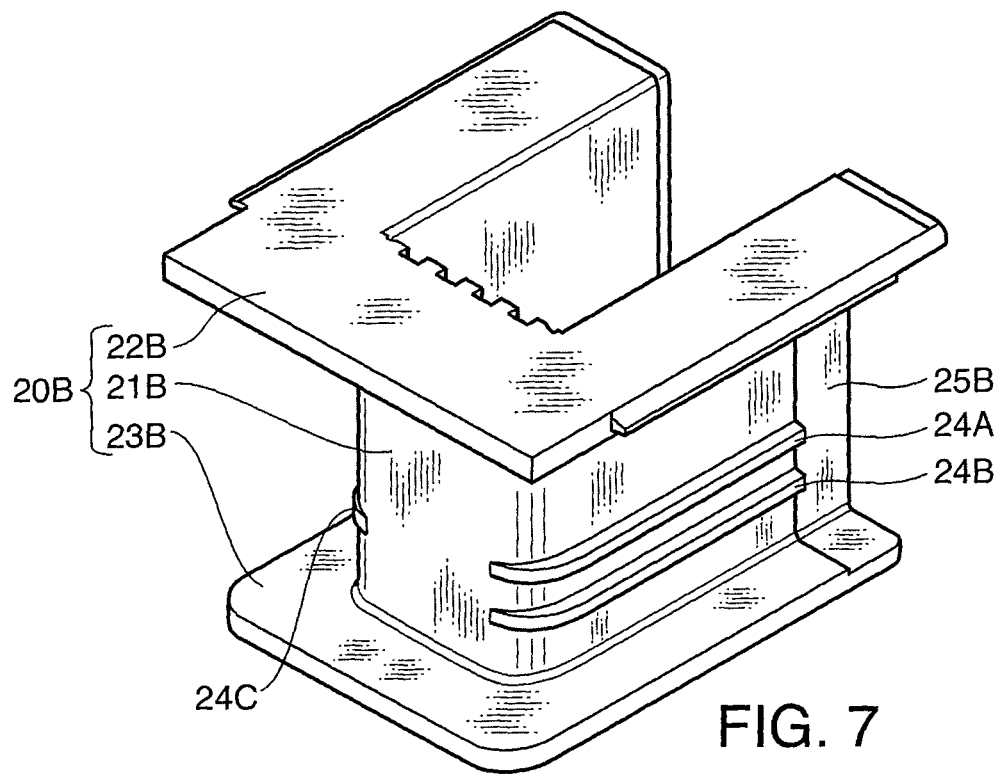
FIG. 7 is a perspective view of the second component when seen from a different direction.

The insulator 20 is made of a first component 20A shown in FIGS. 3 and 4 and a second component 20B shown in FIGS. 6 and 7 which are split in the laminating direction of the electromagnetic steel plate of the stator core 10, for the purpose of fitting onto the tooth 12.

Figure 1:
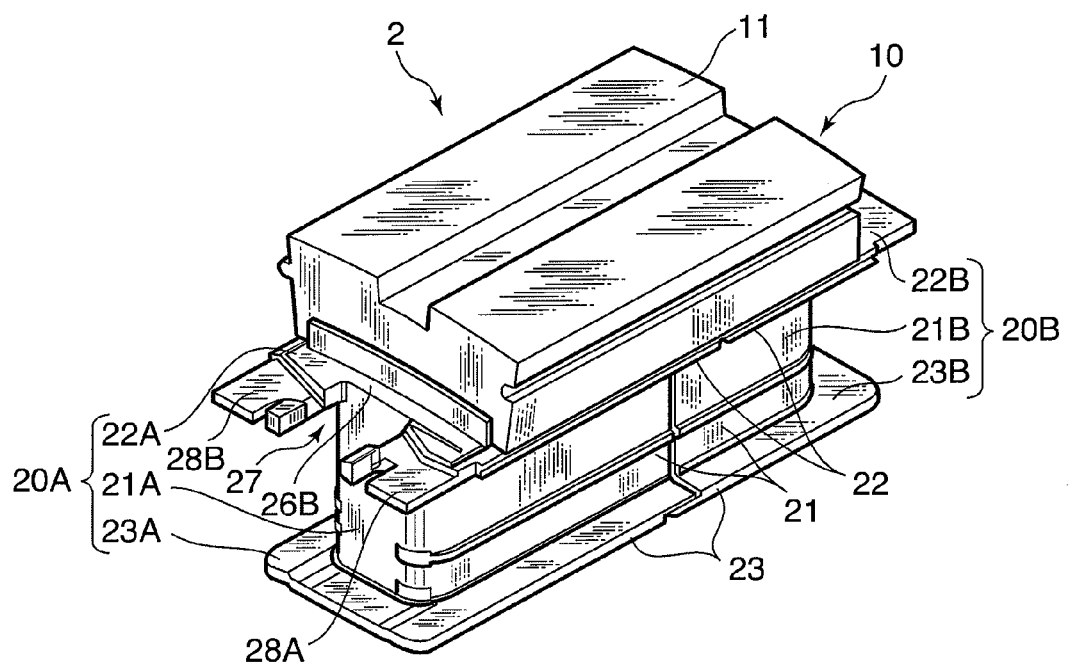
FIG. 1 is a perspective view of an electromagnet for a stator according to an embodiment of this invention.

Referring to FIG. 1, the first component 20A and the second component 20B are engaged with each other to cover the tooth 12 from the both sides thereof in the direction of the center axis of the stator 1.

For this purpose, the first component 20A comprises a winding-barrel element 21A having a U-shaped cross-section, a flange element 22A formed at one end on the back yoke 11 side of the winding-barrel element 21A, and a flange element 23A formed at another end of the winding-barrel element 21A, which is farther from the back yoke 11.

Similarly, the second component 20B comprises a winding-barrel element 21B having a U-shaped cross-section, a flange element 22B formed at one end on the back yoke 11 side of the winding-barrel element 21B, and a flange element 23B formed at another end of the winding-barrel element 21B, which is farther from the back yoke 11.

Regarding the split structure of the insulator 20, a split structure other than the above-described split structure such as splitting the insulator 20 in a direction orthogonal to the laminating direction of the electromagnetic steel plates of the stator core 10, or in other words, splitting the insulator 20 in a circumferential direction of the stator core 10 is also possible. Moreover, splitting the insulator 20 into three to four elements at arbitrary split positions on the outer periphery of the tooth 12 is also possible.

The first component 20A and the second component 20B, when in an engaged state, form the cylindrical winding barrel 21 covering the tooth 12, the first flange 22 provided at the end of the back yoke 11 side of the winding barrel 21, and the second flange 23 provided at the another end of the winding barrel 21, which is farther from the back yoke 11.

Referring to FIGS. 3 and 4, two band-shaped projections 24A and 24B are formed in the winding direction on one of the side faces directed to the connecting direction of the stator core 10 of the winding-barrel element 21A of the first component 20A. On the other side face directed to the connecting direction of the stator core 10 of the winding-barrel element 21A, a single band-shaped projection 24C is formed in the winding direction. The formation position of the band-shaped projection 24C with respect to the radial direction of the stator 1 corresponds to the position between the formation positions of the band-shaped projection 24A and the band-shaped projection 24B. Plural parallel grooves 26A are formed in the radial direction of the stator 1 on a bottom surface 26 of the winding-barrel element 21A in contact with the end face of the tooth 12 with respect to the center axis direction of the stator 1.

A thin fitting part 25A is formed in engaging parts of the winding-barrel element 21A, the flange element 22A, and the flange element 23A with the second component 20B. The thin fitting part 25A is formed by retreating a surface of the winding-barrel element 21A facing the tooth 12, a surface of the flange element 22A facing the back yoke 11, and a surface of the flange element 23A facing the distal end part 122 of the tooth 12 over a predetermined length, respectively.

Continuously to the bottom face 26 of the winding-barrel element 21A, a tab 26B projecting outward in the radial direction of the stator 1 over a predetermined distance is fixed to the flange element 22A. The tab 26B defines, as shown in FIG. 1, relative positions of the stator core 10 and the insulator 20 in the center axis direction of the stator 1 by being brought into contact with one of the end faces of the back yoke 11 with respect to the center axis direction of the stator 1.

In the flange element 22A, a rectangular notch 27 is formed for drawing a winding start part and a winding end part of the coil line material 40 that is wound around the outer periphery of the winding barrel 21 from the winding barrel 21 to the outside of the first flange 22. The notch 27 is formed in a part of the flange element 22A projecting from the stator core 1 in the center axis direction of the stator 1.

By forming the notch 27, a first portion 28A located on one side of the notch 27 and a second portion 28B located on an opposite side of the of the notch 27 to the first portion 28A are formed.

Figure 5:
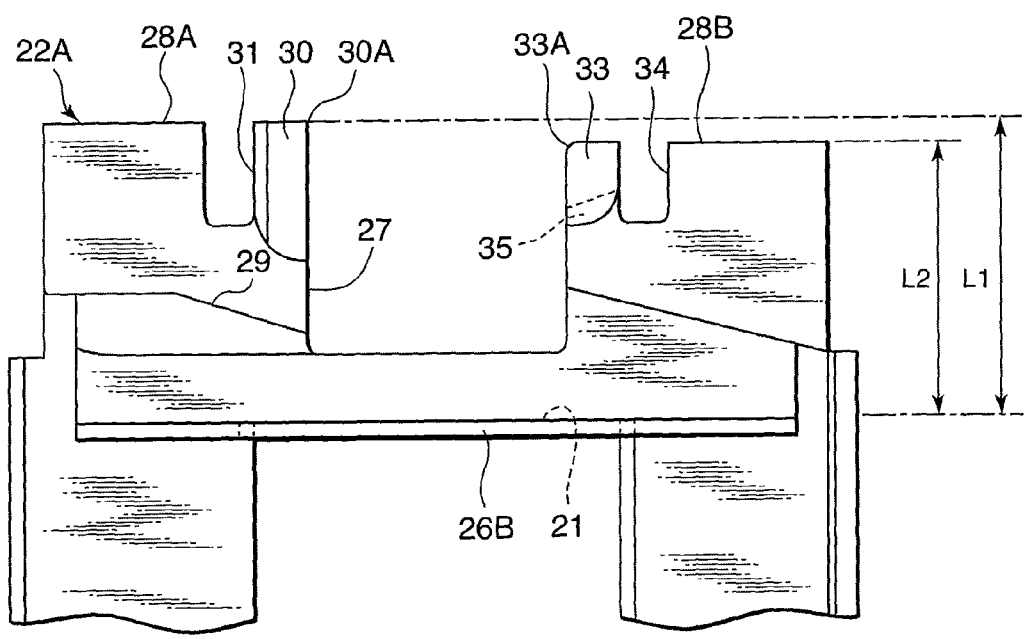
FIG. 5 is an enlarged plan view of essential parts of a flange according to the first component of this invention.

Referring to FIG. 5, the notch 27 and the first portion 28A and the second portion 28B of the flange element 22A are both located farther than the tab 26B from the winding barrel 21 in the center axis direction of the stator 1.

The first portion 28A comprises a winding start positioning projection 30 abutting on the notch 27 and projecting outward in the radial direction of the stator 1. In the first portion 28A, a first groove 31 is formed on the opposite side of the winding start positioning projection 30 to the notch 27. Further, a guide surface 29 for guiding the line material 40 to the notch 27 through a space between the winding start positioning projection 30/first groove 31 and the tab 26B is formed in the first portion 28A.

Figure 22A:
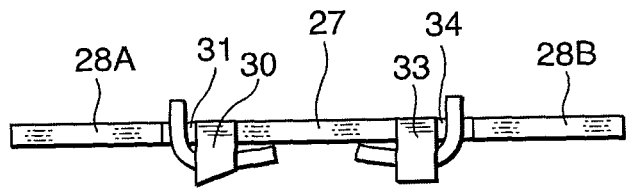
FIGS. 22A-22C are a plan view, a front view, and a side view of the flange for explaining a processing situation of beginning and end of winding of the coil.
Figure 22B:
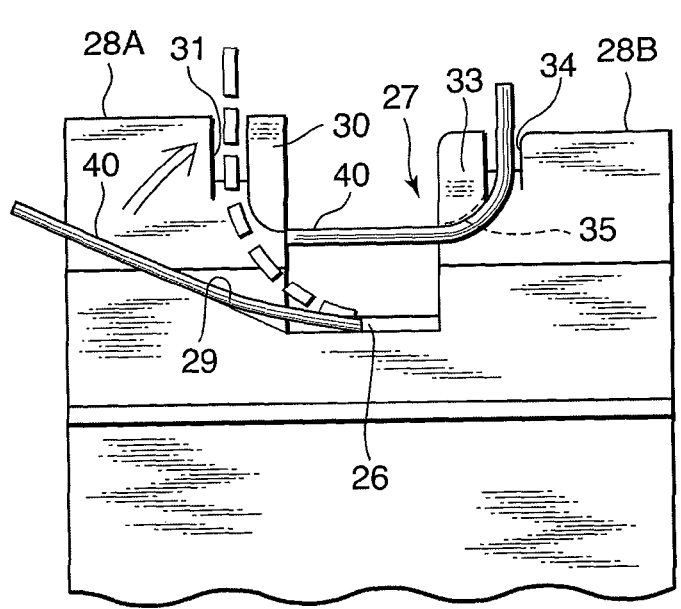

Referring to FIG. 22B, the guide surface 29 is formed as a slope inclined with respect to a bottom side of the notch 27 in order to smoothly guide the line material 40 when the line material 40 is introduced from the outside of the first flange 22 to the winding barrel 21 through the notch 27. The winding start positioning projection 30 performs positioning and locking by bending the winding start part of the line material 40 at the end of winding on the winding barrel 21. The first groove 31 prevents displacement of the winding start part of the line material 40 from the positioning position and also plays a role of locking the winding start part of the line material 40.

Referring to FIG. 5 again, the second portion 28B comprises a winding end positioning projection 33 abutting on the notch 27 and projecting outward in the radial direction of the stator 1. In the second portion 28B, a second groove 34 is formed on the opposite side of the winding end positioning projection 33 to the notch 27. Further, a notch 35 is formed in the winding end positioning projection 33 at a part opposing the tab 26B.

Figure 22C:
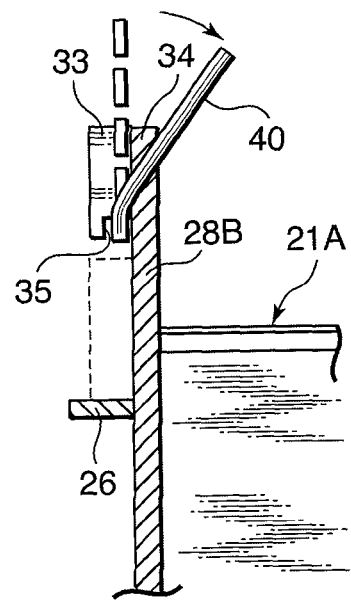

Referring to FIGS. 22B and 22C, the winding end positioning projection 33 performs positioning and locking by bending the winding end part of the line material 40 at the end of winding on the winding barrel 21. The notch 35 formed in the winding end positioning projection 33 prevents loosening of the line material 40 by holding the line material 40 in the bent state. The second groove 34 prevents displacement of the winding end part of the line material 40 from the positioning position and also plays a role of locking the winding end part of the line material 40.

Referring to FIG. 5 again, a projecting length L1 of the first portion 28A from the winding barrel 21 with respect to the axial direction of the stator 1 is set longer than a projecting length L2 of the second portion 28B from the winding barrel 21 with respect to the same direction.

Figure 11:
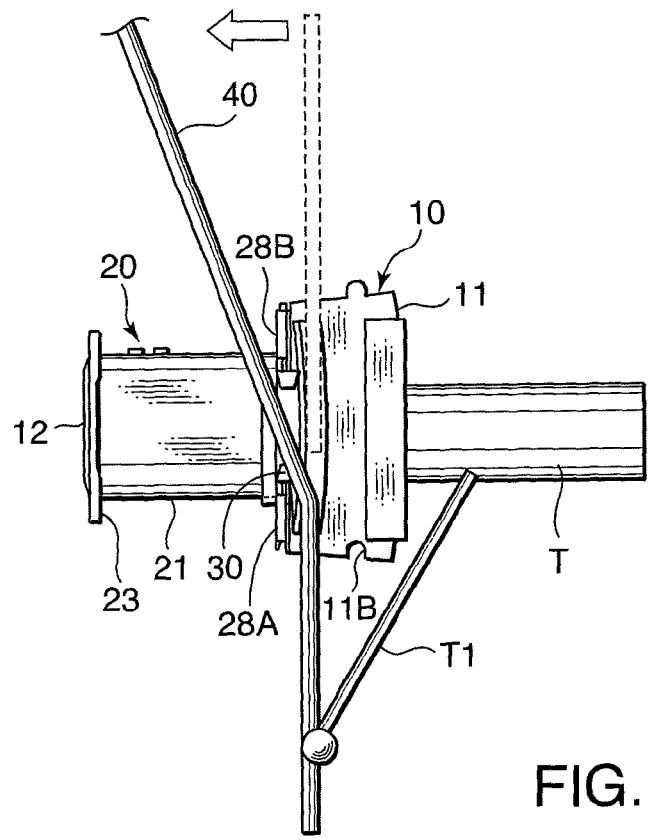
FIG. 11 is an overhead view of the stator core, the jig, and the line material for explaining a second stage of the winding process of the coil on the insulator according to the embodiment of this invention.

Such setting facilitates an operation of bending the line material 40 towards the winding barrel 21 by using the first portion 28A as a fulcrum when the line material 40 is guided to the winding barrel 21 from the outside of the first flange 22 through the notch 27 as shown in FIG. 11.

Moreover, a corner part 30A facing the notch 27 of the first portion 28A is preferably formed to have a square shape. The corner part 30A is also a corner part of the winding start positioning projection 30. More preferably, a corner part 33A facing the notch 27 of the second portion is formed having a circular shape. The corner part 33A is also a corner part of the winding end positioning projection 33. Setting of such shapes of the corner parts 30A and 33A further facilitates the operation of bending the line material 40 towards the winding barrel 21 by using the first portion 28A as a fulcrum.

Referring to FIG. 5 again, the depth of the first groove 31 is set deeper than the depth of the second groove 34 so that a bottom side of the first groove 31 and a bottom side of the second groove 34 are located substantially on the same line. As a result, distances of a start end of the line material 40 locked by the first groove 31 and a terminal end of the line material 40 locked by the second groove 34 from the stator core 10 are maintained equal. Locking the start end and the terminal end of the line material 40 at points of equal distance from the stator core 10 as described above facilitates fixation of the line material 40 of the coil to terminals 51 and 53 of a power collection and distribution bus ring 50 which will be described later.

Referring to FIGS. 6 and 7, the two band-shaped projections 24A and 24B are provided in the winding direction on one side face of the winding-barrel element 21B of the second component 20B, and the single band-shaped projection 24C is provided in the winding direction on the other side face of the winding-barrel element 21B.

The band-shaped projections 24A and 24B are formed continuous with the band-shaped projections 24A and 24B of the winding-barrel element 21A, respectively, on one side face of the winding-barrel element 21B directed to the connecting direction of the stator core 10. The band-shaped projection 24C is formed continuous with the band-shaped projection 24C of the winding-barrel element 21A on the other side face of the winding-barrel element 21B directed to the connecting direction of the stator core 10.

A thin fitting part 25B is formed in engaging parts of the second component 20B with the first component 20A. The thin fitting part 25B is formed by retreating each surface facing the coil winding of the winding-barrel element 21B, flange element 22B, and the flange element 23B over a predetermined length, respectively.

In a state where the first component 20A and the second component 20B are connected, the thin fitting part 25A overlaps with the thin fitting part 25B, and the winding barrel 21, the first flange 22, and the second flange 23 are respectively integrated as shown in FIG. 1.

Figure 12:
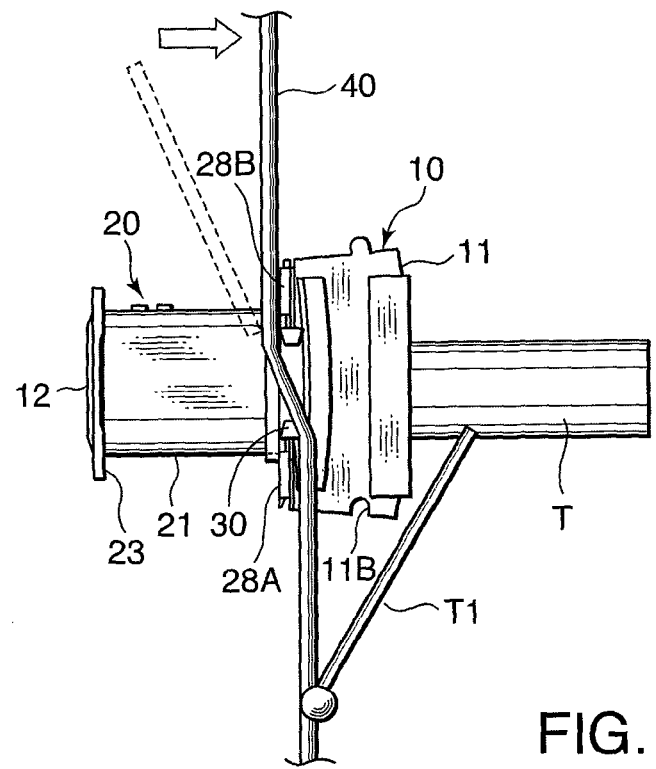
FIG. 12 is an overhead view of the stator core, the jig, and the line material for explaining a third stage of the winding process of the coil on the insulator according to the embodiment of this invention.
Figure 13:
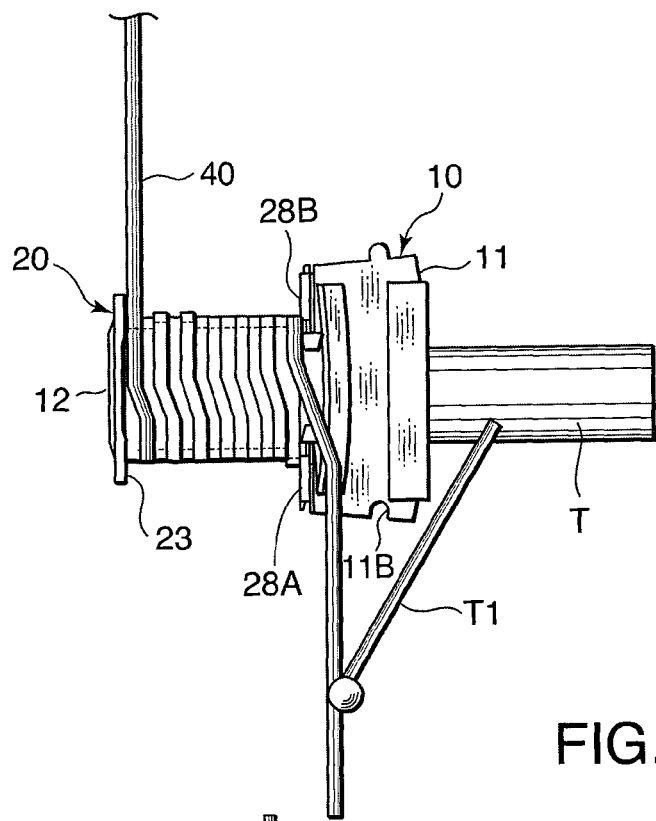
FIG. 13 is an overhead view of the stator core, the jig, and the line material for explaining a fourth stage of the winding process of the coil on the insulator according to the embodiment of this invention.
Figure 14:
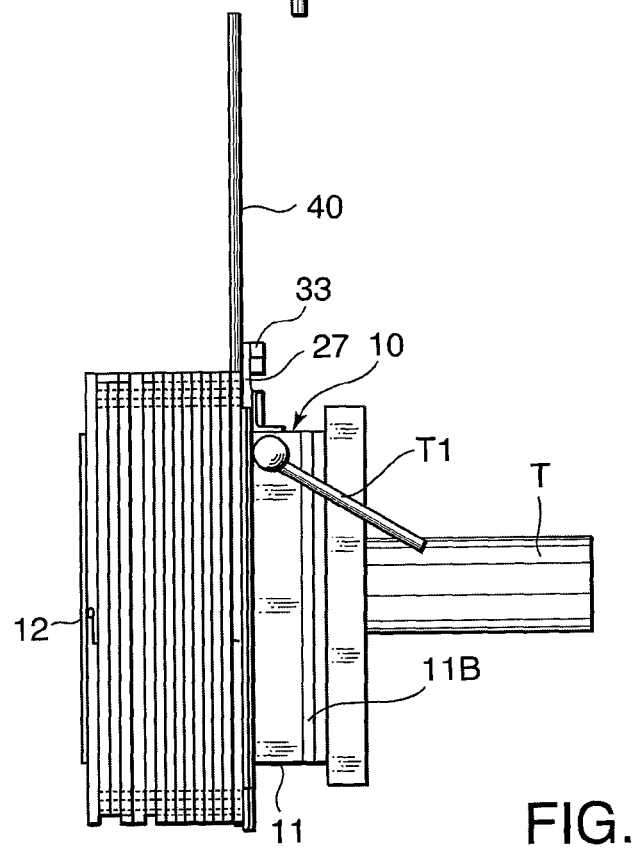
FIG. 14 is an overhead view of the stator core, the jig, and the line material for explaining a fifth stage of the winding process of the coil on the insulator according to the embodiment of this invention.
Figure 15:
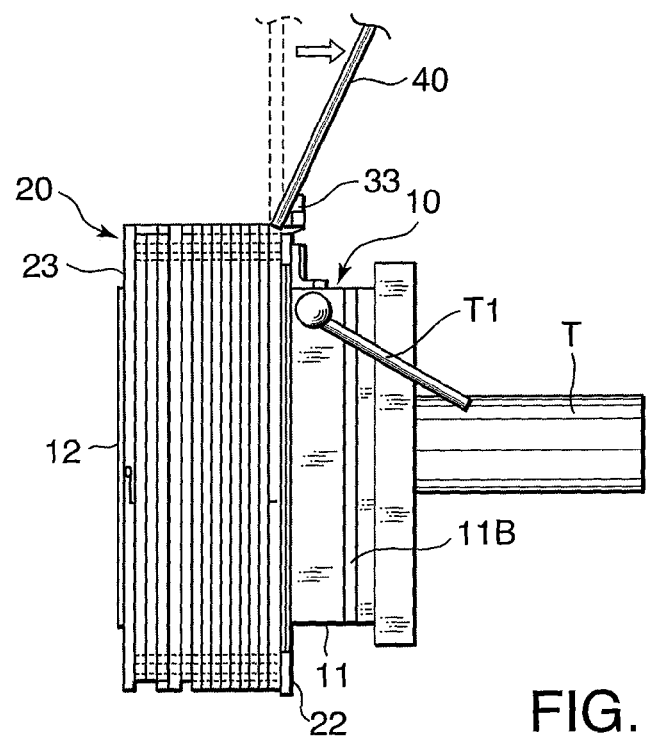
FIG. 15 is an overhead view of the stator core, the jig, and the line material for explaining a sixth stage of the winding process of the coil on the insulator according to the embodiment of this invention.
Figure 17:
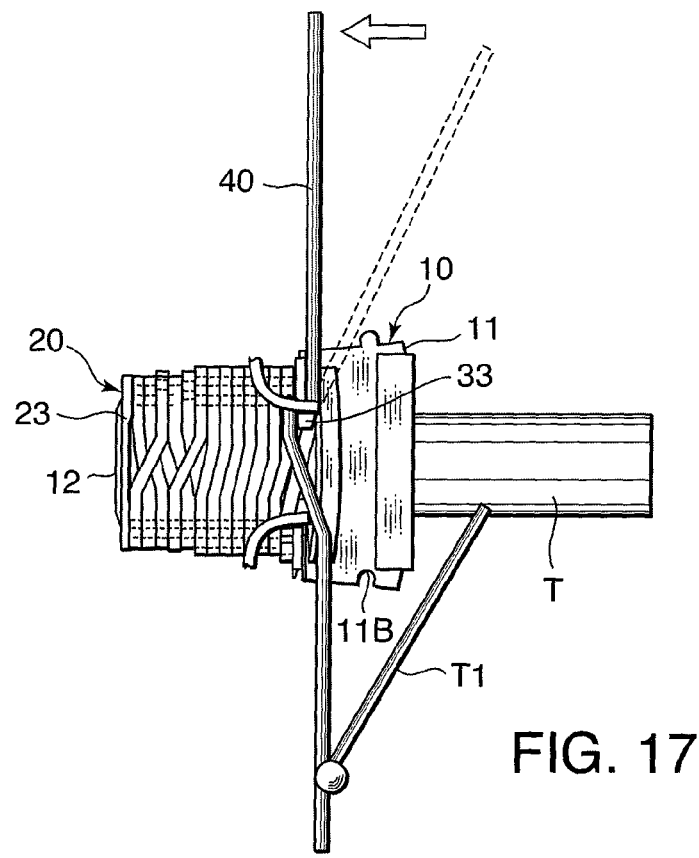
FIG. 17 is an overhead view of the stator core, the jig, and the line material for explaining an eighth stage of the winding process of the coil on the insulator according to the embodiment of this invention.
Figure 18:
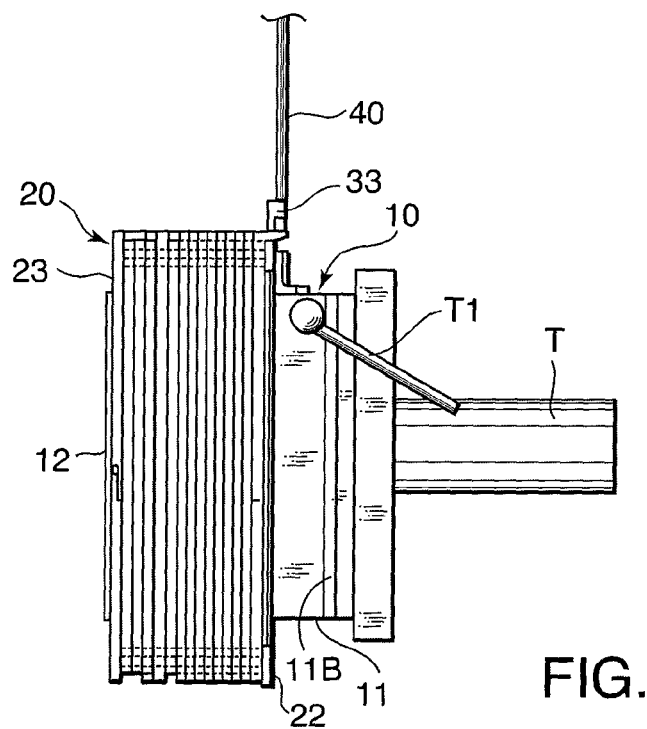
FIG. 18 is an overhead view of the stator core, the jig, and the line material for explaining a ninth stage of the winding process of the coil on the insulator according to the embodiment of this invention.

The coil winding on the insulator 20 is performed in a process shown in FIG. 9 to FIG. 18 in a state where the insulator 20 is attached to the stator core 10 as shown in FIG. 1. FIG. 8 illustrates a state of the coil where the winding has been completed. FIG. 9 to FIG. 18 are overhead views of the insulator 20 seen from above showing a winding process, FIGS. 9 to 13 and FIGS. 16 and 17 illustrate a state in which the recess 11B is directed in the horizontal direction, while FIGS. 14, 15, and 18 illustrate a state in which the stator core 10 and the insulator 20 are rotated by substantially 90 degrees and the recess 11B is directed upward.

Figure 9:
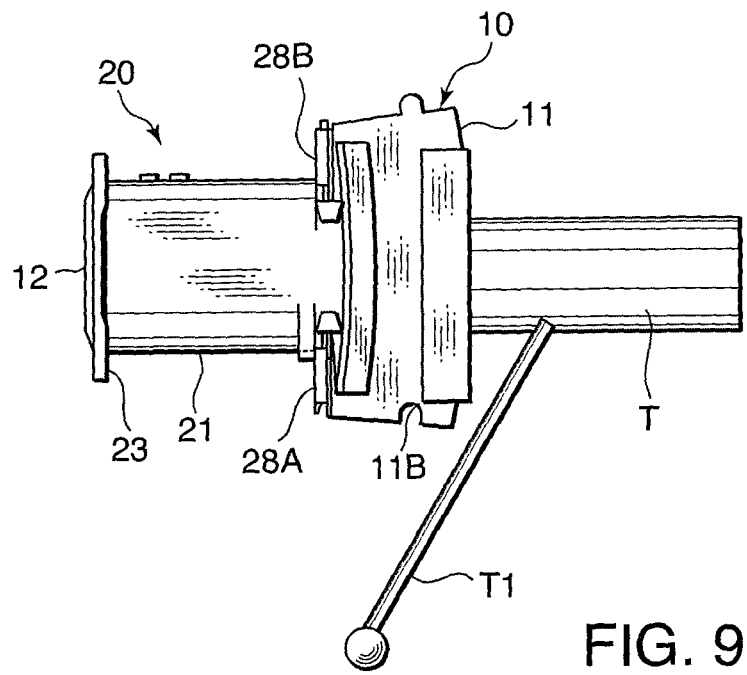
FIG. 9 is an overhead view of the stator core and a jig according to the embodiment of this invention.

Referring to FIG. 9, the coil winding on the insulator 20 is performed in a state where the back yoke 11 of the stator core 10 is gripped by a coil winding jig T with respect to the laminating direction of the electromagnetic steel plates of the stator core 10, or in other words, in the center axis direction of the stator 1. The coil-winding jig T is driven to rotate by a rotating driving device. As the coil winding jig T rotates, the stator core 10 and the insulator 20 integrally rotates. The coil-winding jig T comprises a line-material retainer T1.

Figure 10:
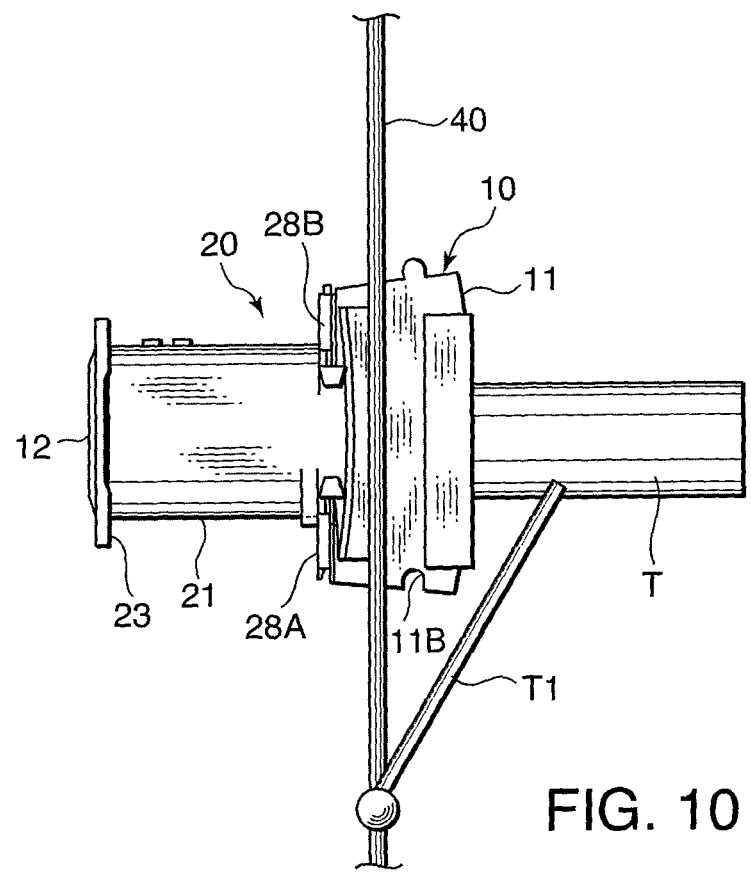
FIG. 10 is an overhead view of the stator core, the jig, and a line material for explaining a first stage of a winding process of the coil on the insulator according to the embodiment of this invention.

Referring to FIG. 10, the line-material retainer T1 holds the end portion of the line material 40 supplied from above in the figure by a line-material supplying device. The line-material retainer T1 holds a constant relative position with respect to the stator core 10 and the insulator 20. When the line-material retainer T1 integrally rotates with the coil-winding jig T with respect to the line-material supplying device in a stationary state, the line material 40 is wound around the winding barrel 21 of the insulator 20. The line-material supplying device supplies the line material 40 through a line material guide reciprocating in the center axis direction of the winding barrel 21 in accordance with the winding position of the line material 40 on the winding barrel 21.

Prior to the operation of the coil-winding jig T to wind the line material 40 on the winding barrel 21, the line material 40 supplied from the line-material supplying device is held by the line-material retainer T1. At this time, the line material guide is adjusted so that the line material 40 is located above the back yoke 11, that is, so that the line material 40 is located outside the first flange 22 with respect to the center axis direction of the winding barrel 21.

Referring to FIG. 11, the line material guide is moved in a direction designated by an arrow in the figure, or in other words, the line material guide is moved towards the distal end of the tooth 12. The line material 40 held by the line-material retainer T1 at the end portion is thereby bent from the winding start positioning projection 30 towards the winding barrel 21 and guided to the notch 27 while being supported by the winding start positioning projection 30 formed on the first portion 28A of the first flange 22.

Here, as shown in FIG. 5, the projecting length L1 of the first portion 28A from the winding barrel 21 is set longer than the projecting length L2 of the second portion 28B from the winding barrel 21.

Figure 19:
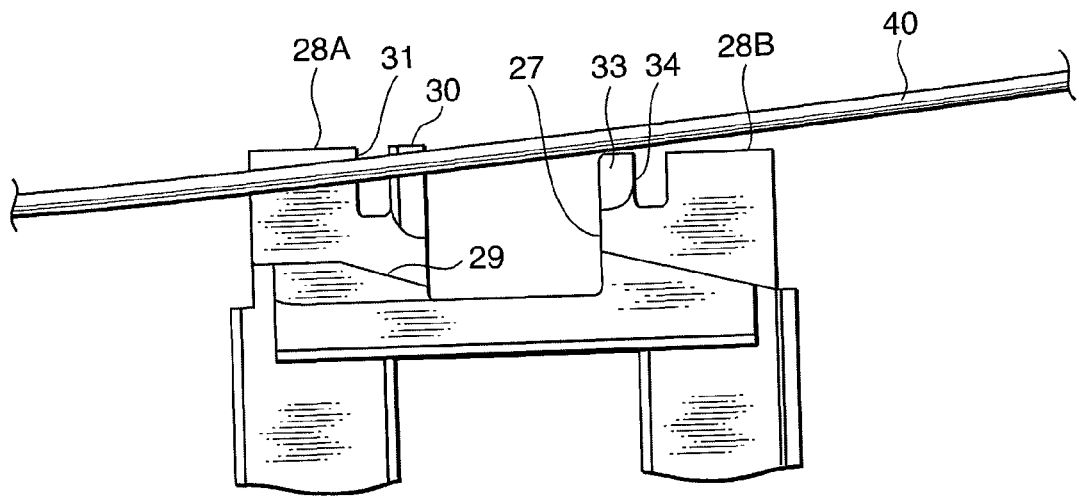
FIG. 19 is an enlarged plan view of the essential parts of the flange and the line material for explaining a situation of the second stage of the coil winding process.
Figure 20:
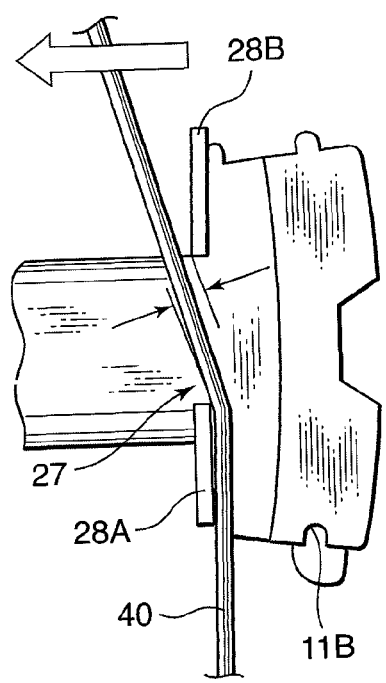
FIG. 20 is an enlarged overhead view of the essential parts of the flange and the line material for explaining the situation of the second stage of the coil winding process.

Referring to FIGS. 19 and 20, by setting of the projecting lengths L1 and L2 as the above, interference between the line material 40 and the second portion 28B can be avoided when the line material 40 is bent toward the winding barrel 21 by the line material guide by using the winding start positioning projection 30 as a fulcrum.

Moreover, since a tension is applied to the line material 40 by the line material guide and the line-material retainer T1, even the line material 40 having a bending tendency is reliably guided to the winding barrel 21 through the notch 27.

Figure 25:
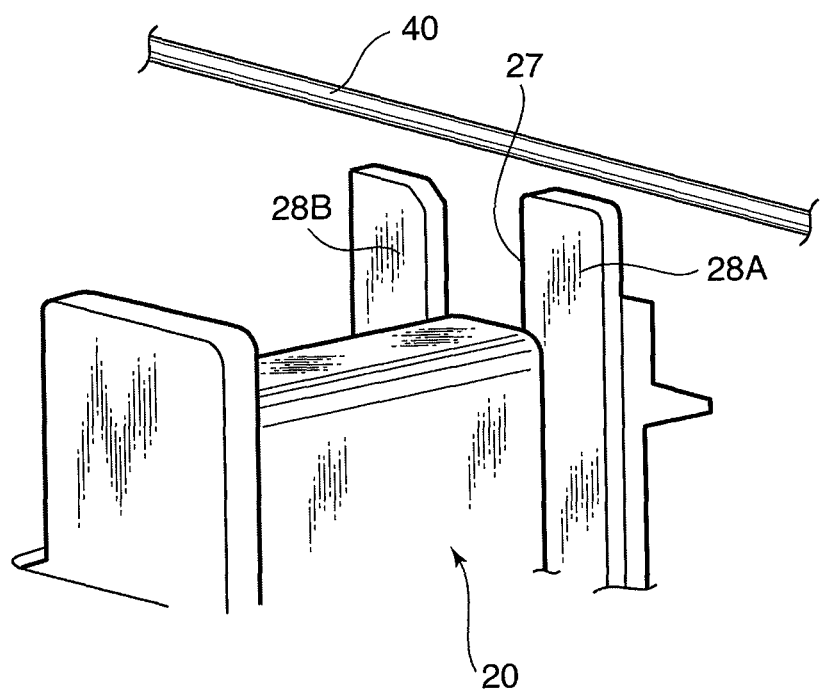
FIG. 25 is a perspective view of the insulator and the line material illustrating an introduction process of the line material into the notch in an electromagnet for a stator in a comparative example not according to this invention.
Figure 26:
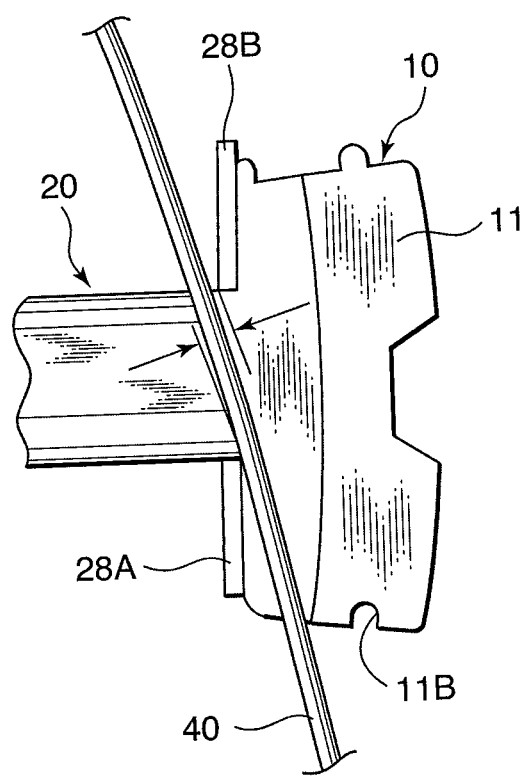
FIG. 26 is an overhead view of the insulator and the line material illustrating the introduction process of the line material into the notch in the electromagnet for the stator in the comparative example not according to this invention.

Referring to FIGS. 25 and 26, a case where the projecting lengths of the first portion 28A and the second portion 28B of the first flange 22 from the winding barrel 21 are the same will be described. In this case, when the line material 40 is bent by using the first portion 28A as a fulcrum, the line material 40 is apt to interfere with the second portion 28B.

To avoid the interference, the extending direction of the line material 40 is slanted in advance with respect to the first flange 22 as shown in FIG. 26, and the line material 40 is guided to the notch 27. In this case, a path that the line material 40 can take to pass through the notch 27 is limited to a narrow range illustrated by arrows in FIG. 26. It is difficult to efficiently guide the line material 40 to the notch 27. If the path that the line material 40 can take is narrow, it becomes also difficult to guide the line material 40 having a bending tendency.

Referring to FIG. 20 again, by setting the projecting length L1 of the first portion 28A from the winding barrel 21 longer than the projecting length L2 of the second portion 28B from the winding barrel 21 as in this stator 1, the line material 40 can be bent in the horizontal direction by using the first portion 28A as a fulcrum and can be guided to the winding barrel 21 over the second portion 28B.

Figure 21:
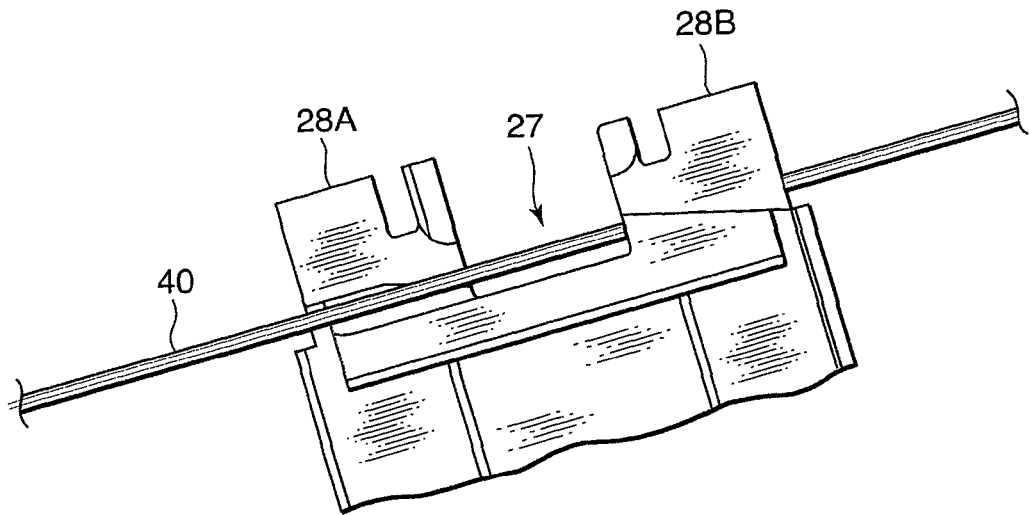
FIG. 21 is an enlarged overhead view of the essential parts of the flange and the line material when the second stage of the coil winding process is completed.

Referring to FIG. 21, by driving the coil winding jig T to rotate and starting winding of the line material 40 on the winding barrel 21 in this state, the line material 40 is reliably guided to the inside of the notch 27. As described above, interference between the line material 40 and the first flange 22 is avoided without failure, and the winding start position of the winding can be positioned with precision.

Figure 27:
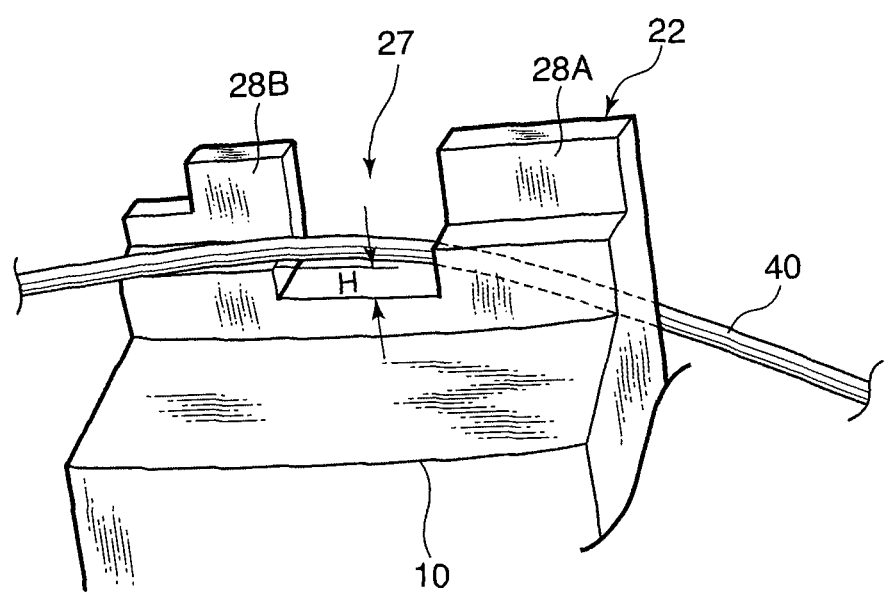
FIG. 27 is a perspective view of the insulator and the line material illustrating the state of completion of the introduction process of the line material into the notch in the electromagnet for the stator in the comparative example not according to this invention.

Referring to FIG. 27, if a step H is present inside the first flange 22 on the back yoke 11 side, the line material 40 guided to the notch 27 floats from the winding barrel 21 by a portion corresponding to the step H. The line material 40 wound in a layered state on top of the portion also floats from the winding barrel 21. As a result, the height of the coil end becomes high.

In this stator 1, the guide surface 29 which guides the line material 40 is formed on the first portion 28A in a space between the first groove 31/winding start positioning projection 30 and the tab 26B. By forming the guide surface 29, even if there is the step H, the line material 40 reaching the winding barrel 21 through the notch 27 is reliably brought into contact with the surface of the winding barrel 21. Therefore, floating of the line material 40 from the winding barrel 21 can be prevented.

Referring to FIG. 12, after the line material 40 is guided to the winding barrel 21 through the notch 27, the line material guide is moved to a direction designated by an arrow in the figure and the line material 40 is brought into contact with the second portion 28B of the first flange 22 so as to position the winding start of the line material 40 on the winding barrel 21. By driving the coil-winding jig T to rotate in this state, the line material 40 is wound around the winding barrel 21. By moving the line material guide in parallel with the winding barrel 21 in accordance with the winding, the line material 40 is wound side by side without a gap onto the winding barrel 21.

Referring to FIG. 13, by continuing this winding work, the winding of the line material 40 on the winding barrel 21 reaches the second flange 23. After that, by driving the coil-winding jig T to rotate while the line material guide is moved in the opposite direction in parallel with the winding barrel 21, the line material 40 is newly wound on the layer of the line material 40 having been already wound. As described above, the winding of the line material 40 is performed in several layers between the first flange 22 and the second flange 23.

Referring to FIG. 14, when the predetermined number of layers of winding is complete, the rotation of the coil winding jig T is stopped at a rotation position where the line material 40 comes to the vicinity of the notch 27 of the first flange 22. This corresponds to a rotation position of the stator core 10 after the coil winding jig T is somewhat rotated from a position where the opening direction of the recess 11B becomes horizontal.

Referring to FIG. 15, in this state, the line material guide is moved to the outside of the first flange 22 in parallel with the winding barrel 21 as illustrated by an arrow in the figure. With this movement, the line material 40 having finished the winding on the winding barrel 21 is taken out to the outside of the first flange 22 through the notch 27.

Referring to FIG. 16, by driving the coil winding jig T to rotate by substantially 90 degrees from the state of FIG. 15 and by stopping it, the line material 40 is engaged with the notch 35 of the winding end positioning projection 33 formed on the second portion 28B of the first flange 22.

Referring to FIG. 17, after the line material 40 is engaged with the notch 35, the line material guide is moved in parallel with the winding barrel 21 and in the direction opposite to that in FIG. 15 as illustrated by an arrow in the figure again.

Referring to FIG. 18, the coil-winding jig T is further driven to rotate by substantially 90 degrees and stopped. As a result, the line material 40 having passed the notch 27 is locked by the notch 35 of the winding end positioning projection 33. In this state, the line material 40 is cut off between the notch 35 and the line material guide. Moreover, the winding start portion of the line material 40 is cut off between the winding start positioning projection 30 of the first portion 28A and the line-material retainer T1. As a result, the winding of the line material 40 on the winding barrel 21 is completed as shown in FIG. 8.

In this state, as shown in FIG. 22A, the winding end portion of the line material 40 passes through the notch 27, goes around the winding end positioning projection 33 through the notch 35 of the winding end positioning projection 33 and extends upward. As shown in FIG. 22C, this portion is bent to the winding barrel 21 side through the locking groove 34. The winding end portion of the line material 40 tends to become loose by a spring-back action of the coil caused by elasticity of the line material 40. In this stator 1, after the winding end portion of the line material 40 is engaged with the notch 35, the line material 40 goes around the winding end positioning projection 33 and is further bent to the winding barrel 21 side from the locking groove 34 so as to prevent loosening of the line material 40.

The winding start portion of the line material 40 after being cut off, as shown in FIG. 22B, extends diagonally along the guide surface 29. This portion is bent upward by using the winding start positioning projection 30 of the first portion 28A in the first flange as a guide and further bent to the winding barrel 21 side through the locking groove 31 as shown in FIG. 22C. Since the winding start portion of the line material 40 is pressed by the winding on the upper layer, the loosening is hardly generated, and by routing the line material 40 around the winding start positioning projection 30 and then, bending it to the winding barrel 21 side from the locking groove 31, the loosening of the winding start portion of the line material 40 is also prevented.

As described above, by attaching the insulator 20 to the stator core 10 and by winding a coil on the winding barrel 21 of the insulator 20, the single electromagnet 2 is constructed. The predetermined number of electromagnets 2 constructed as above are sequentially connected by inserting the projection 11A of the back yoke 11 to the recess 11B of the adjacent back yoke 11 to constitute the ring-shaped stator 1.

Referring to FIG. 23, the ring-shaped stator 1 is arranged inside the power collection and distribution bus ring 50 provided on the housing of an electric motor or a generator. The power collection and distribution bus ring 50 has a terminal 51 for connecting a start end 40A of the coil of each electromagnet 2 and a terminal 52 for connecting a terminal end 40B of the coil of each electromagnet 2 alternately provided.

The terminal 51 has a gap 51A, and the gap 51A is closed by tightening the terminal 51 by a tool in a state where the start end 40A is inserted into the gap 51A. The start end 40A is thereby held in a fixed manner. Similarly, the terminal 52 has a gap 52A, and the gap 52A is closed by tightening the terminal 52 by a tool in a state where the terminal end 40B is inserted into the gap 52A. The terminal end 40B is thereby held in a fixed manner.

In each of the electromagnets 2, the coil start end 40A has a taking-out position fixed by going around the winding start positioning projection 30. The coil terminal end 40B has a taking-out position fixed by going around the winding end positioning projection 33. By setting the positions of the winding start positioning projection 30 and the winding end positioning projection 33 so as to match intervals in the circumferential direction of the terminals 51 and 52, connection of the coil start end 40A to the terminal 51 and connection of the coil terminal end 40B to the terminal 52 can be both performed with a shortest distance.

Moreover, in the stator 1, the coil start end 40A and the terminal end 40B are held inside the locking grooves 31 and 34, respectively. The locking grooves 31 and 34 have a role of preventing displacement of the coil start end 40A and the terminal end 40B and of holding them at positioning positions when the plurality of electromagnets 2 are assembled to the ring-shaped stator 1 and when the assembled stator 1 is arranged inside the power collection and distribution bus ring 50. Therefore, the first groove 31 and the second groove 34 further facilitate the connection work of the start end 40A and the terminal end 40B to the terminals 51 and 52.

However, positioning itself of the line material 40 can be made by the winding start positioning projection 30 and the winding end positioning projection 33. Therefore, it is possible to form only the notch 27, the winding start positioning projection 30, and the winding end positioning projection 33 on the first flange 22 as illustrated and to omit the first groove 31 and the second groove 34.

Figure 24:
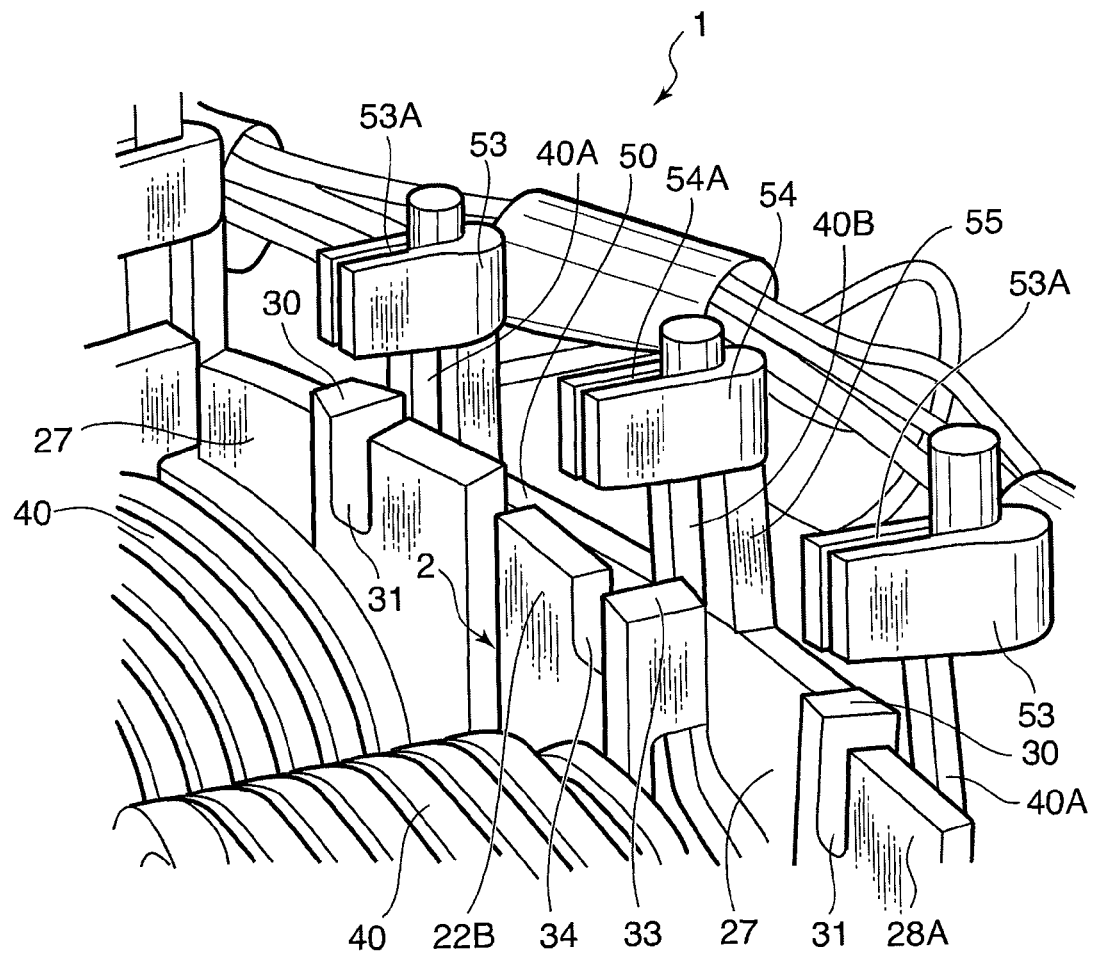
FIG. 24 is a perspective view of essential parts of the stator showing a variation of the bus ring for power collection and distribution.

Referring to FIG. 24, another configuration of the power collection and distribution bus ring 50 will be described.

This power collection and distribution bus ring 50 is provided with terminals 53 and 54 instead of the terminals 51 and 52 in FIG. 23.

The terminals 53 and 54 are supported by a support column 55 at positions overlapping with the locking grooves 31 and 34, respectively, with respect to the center axis direction of the stator 1. The terminal 53 has a gap 53A, and the gap 53A is closed by tightening the terminal 53 by a tool in a state where the start end 40A is inserted into the gap 53A, and the start end 40A is held in a fixed manner. Similarly, the terminal 54 has a gap 54A, and the gap 54A is closed by tightening the terminal 54 by a tool in a state where the terminal end 40B is inserted into the gap 54A, and the terminal end 40B is held in a fixed manner. However, the terminals 53 and 54 are fixed to the support column 55 so that opening ends of the gaps 53A and 54A are directed to the center of the stator 1.

With the power collection and distribution bus ring 50 having the terminals 53 and 54 configured as above, it is likely that the start end 40A and the terminal end 40B of the coil interfere with the terminals 53 and 54 when the ring-shaped stator 1 is inserted into the inside of the power collection and distribution bus ring 50. By forming the first groove 31 and the second groove 34 in the first flange 22 and by inserting the ring-shaped stator 1 into the inside of the power collection and distribution bus ring 50 in a state where the coil start end 40A and the terminal end 40B are bent in the center direction of the stator 1 through the first groove 31 and the second groove 34, such interference can be prevented.

In this case, after the stator 1 is inserted at a predetermined position into the inside of the power collection and distribution bus ring 50, the start end 40A and the terminal end 40B of the coil bent towards the center direction of the stator 1 through the first groove 31 and the second groove 34 are both straighten to a linear state so that they can be easily introduced into the gaps 53A and 54A.

The contents of Tokugan2010-065753, with a filing date of Mar. 23, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, the line material 40 to be wound on the insulator 20 may have a square section or a circular section. The notch 27 is not limited to a rectangle but a U-shaped or V-shaped notch 27, for example, will do.

INDUSTRIAL FIELD OF APPLICATION

By using the stator to which the electromagnet according to this invention is applied, preferable effects can be obtained in rationalization of a manufacturing process of an electric motor and a generator and improvement in a manufacturing quality. The embodiments of this invention in which an exclusive property or privilege is claimed are defined as follows:

The invention claimed is:

1. An electromagnet for a stator comprising:
    a stator core formed of a back yoke and a tooth projecting from the back yoke;
    an insulator attached to the tooth; and
    a coil wound around the insulator,
    wherein
    the insulator comprises a winding barrel around which the coil is wound in a plurality of layers, a first flange formed at one end of the winding barrel adjacent to the back yoke, the first flange having a notch through which a line material of the coil passes, and a second flange formed at another end of the winding barrel such that the line material of the coil is guided to the winding barrel through the notch from an outside of the first flange, wound around the winding barrel, and taken out of the first flange through the notch;
    the first flange comprises a first portion located on a side of the notch for positioning a winding start of the line material and a second portion located on an opposite side of the notch to the first portion for positioning a winding end of the line material; and
    a projecting length of the first portion from the winding barrel is set to be longer than a projecting length of the second portion from the winding barrel.

2. The electromagnet for a stator as defined in claim 1, wherein the first portion comprises a square corner part abutting on the notch and the second portion comprises a circular corner part abutting on the notch.

3. The electromagnet for a stator as defined in claim 1, wherein the second portion comprises a winding end positioning projection projecting toward the back yoke for positioning a winding end position of the line material in the vicinity of the notch.

4. The electromagnet for a stator as defined in claim 3, wherein the first portion comprises a winding start positioning projection projecting toward the back yoke for positioning a winding start position of the line material in the vicinity of the notch.

5. The electromagnet for a stator as defined in claim 4, wherein the first portion comprises a first groove formed on an opposite side of the winding start positioning projection to the notch for positioning a start end of the line material, and the second portion comprises a second groove formed on an opposite side of the winding end positioning projection to the notch for positioning a terminal end of the line material.

6. The electromagnet for a stator as defined in claim 5, wherein a depth of the first groove is set to be deeper than a depth of the second groove.

7. A manufacturing method of an electromagnet for a stator, comprising:
    attaching an insulator to a tooth of a stator core, the insulator comprising a winding barrel, a first flange formed at one end of the winding barrel and having a notch through which a line material of a coil passes, and a second flange formed at another end of the winding barrel, and the stator core comprising a back yoke from which the tooth projects, wherein projecting lengths of the first flange from the winding barrel on both sides of the notch are set to be different from each other;
    guiding the line material of the coil to the winding barrel from an outside of the first flange through the notch;
    winding the line material on the winding barrel in a plurality of layers; and
    taking out the line material from the winding barrel to the outside of the first flange through the notch,
    wherein the first flange comprises a first portion located on a side of the notch for positioning a winding start of the line material and a second portion located on an opposite side of the notch to the first portion for positioning a winding end of the line material, and a projecting length of the first portion from the winding barrel is set to be longer than a projecting length of the second portion from the winding barrel.

\* \* \* \* \*